United States Patent
Kristjansson et al.

(10) Patent No.: US 10,233,728 B2
(45) Date of Patent: Mar. 19, 2019

(54) METHOD AND APPARATUS FOR DRILLING A NEW WELL USING HISTORIC DRILLING DATA

(71) Applicant: PASON SYSTEMS CORP., Calgary (CA)

(72) Inventors: Sean Kristjansson, Calgary (CA); Stephen Lai, Calgary (CA); Dean Tremaine, Calgary (CA)

(73) Assignee: PASON SYSTEMS CORP. (CA)

( * ) Notice: Subject to any disclaimer, the term of this patent is extended or adjusted under 35 U.S.C. 154(b) by 0 days.

(21) Appl. No.: 15/531,994

(22) PCT Filed: Mar. 27, 2015

(86) PCT No.: PCT/CA2015/050241
§ 371 (c)(1),
(2) Date: May 31, 2017

(87) PCT Pub. No.: WO2016/154723
PCT Pub. Date: Oct. 6, 2016

(65) Prior Publication Data
US 2017/0328181 A1 Nov. 16, 2017

(51) Int. Cl.
*E21B 44/00* (2006.01)
*E21B 45/00* (2006.01)
(Continued)

(52) U.S. Cl.
CPC .......... *E21B 41/0092* (2013.01); *E21B 7/00* (2013.01); *E21B 7/04* (2013.01); *E21B 21/00* (2013.01);
(Continued)

(58) Field of Classification Search
CPC ...... E21B 41/0092; E21B 44/00; E21B 45/00; G06N 5/047; G05B 13/00; G05B 13/04
See application file for complete search history.

(56) References Cited

U.S. PATENT DOCUMENTS

| 7,142,986 B2 | 11/2006 | Moran |
| 7,878,268 B2 | 2/2011 | Chapman et al. |

(Continued)

OTHER PUBLICATIONS

Landmark Software and Services White Paper, Using Historical Well Data to Increase the Accuracy of Drilling AFEs, 2013 Halliburton, 12 pp.*

(Continued)

*Primary Examiner* — Toan Le
(74) *Attorney, Agent, or Firm* — Katten Muchin Rosenman LLP

(57) ABSTRACT

A method for drilling a new oil or gas well in a selected geographical location includes extracting drilling modes from historic drilling data obtained from a group of drilled wells in the selected geographical location using a pattern recognition model. Each drilling mode represents a distinct pattern that quantifies at least two drilling variables at a specified drilling depth. The method also includes selecting a sequence of drilling modes at positions along a reference well as reference drilling modes that represent more efficient values for a selection of one or more of the at least two drilling variables compared to other extracted drilling modes; associating drilling parameter settings with the reference drilling modes; and drilling the new oil or gas well applying at least some of the drilling parameter settings.

10 Claims, 18 Drawing Sheets

(51) Int. Cl.
| | |
|---|---|
| E21B 41/00 | (2006.01) |
| E21B 7/00 | (2006.01) |
| E21B 7/04 | (2006.01) |
| E21B 21/00 | (2006.01) |
| E21B 47/022 | (2012.01) |
| E21B 47/04 | (2012.01) |
| E21B 47/06 | (2012.01) |
| E21B 49/00 | (2006.01) |
| G06N 5/04 | (2006.01) |

(52) U.S. Cl.
CPC .............. *E21B 44/00* (2013.01); *E21B 45/00* (2013.01); *E21B 47/022* (2013.01); *E21B 47/04* (2013.01); *E21B 47/06* (2013.01); *E21B 49/00* (2013.01); *G06N 5/047* (2013.01)

(56) References Cited

U.S. PATENT DOCUMENTS

| | | | |
|---|---|---|---|
| 8,099,266 | B2 | 1/2012 | Burge et al. |
| 2012/0118637 | A1 | 5/2012 | Wang et al. |
| 2013/0066445 | A1* | 3/2013 | Wang .................... G05B 13/00 700/28 |
| 2015/0345262 | A1 | 12/2015 | Kpetehoto et al. |
| 2015/0369030 | A1 | 12/2015 | Hay et al. |

OTHER PUBLICATIONS

Transmittal; International Search Report; and Written Opinion of the International Searching Authority for International Application No. PCT/CA2015/050241 dated Nov. 12, 2015.

Adeley, A.R., Virginioolo, B.K., Iyoho, A.W., Parenteau, K., Lids, H., (2004). Improving Drilling Performance Through Systematic Analysis of Historic Data: Study of a Canadian Field. Paper IADC/SPE 87177 presented at IADC/SPE Drilling Conference, Dallas, U.S.A., Mar. 2-4.

Bacher, J. (2000). "A probabilistic clustering model for variables of mixed type," Quality and Quantity, 34, 223-35).

Banfield, J.D., & Raftery, A.E. (1993). "Model-based Guassian and non-Guassian clustering", Biometrics, 49, 803-821.

Bevilacqua ,M., Ciarapica F. E. & Marchetti B., (2013). Acquisition, Processing and Evaluation of Down Hole Data for Monitoring Efficiency of Drilling Processes. Journal of Petroleum Science Research, vol. 2, Issue 2.

Cheeseman, P., & Stutz, J. (1995). "Bayesian classification (Autoclass): Theory and results." In U. M. Fayyad, G. Piatetsky-Shapiro, P. Smyth, & R. Uthurusamy (eds.) Advances in Knowledge Discovery and Data Mining. Menlo Park: The AAAI Press.

Everitt, B.S. (1993). Cluster Analysis. London: Edward Arnold.

Frenzel, M., Wessell, M., Brown, C., (2014). Case Histories of Real Time Drilling Optimization Combining Drill String Modeling, Surface Measurements and Down-Hole Measurements. Paper IADC/SPE 167960 presented at IADC/SPE Drilling Conference, Fort Worth, U.S.A., Mar. 4-6.

Jorgensen, M. & Hunt, L. ( 1996). "Mixture-model clustering of data sets with categorical and continuous variables," In Proceedings of the Conference ISIS '96, Australia, 1996, pp. 375-384.

Lubke, G. H., & Muthen, B. (2005). Investigating population heterogeneity with factor mixture models, Psychological Methods, 10(1), 21-39.

McLachlan, G.J., & Basford, K.E.,(1988). Mixture Models: inference and Application to Clustering. New York: Marcel Dekker.

McLachlan, G.J., & Peel, D. (1996). "An algorithm for unsupervised learning via normal mixture models." In D.L. Dowe, K. B. Korb, & J.J. Oliver (eds.), Information, Statistics and Induction in Science. Singapore: World Scientific.

Mensa-Wilmot G., Harjadi Y., Langdon S., & Gagneaux J., (2010). Drilling Efficiency and Rate of Penetration-Definitions, Influencing Factors, Relationships and Value. Paper IADC/SPE 128288 presented at IADC/SPE Drilling Conference, New Orleans, U.S.A., Feb. 2-4.

Staveley C., & Thow P. (2010)., Increasing Drilling Efficiencies Through Improved Collaboration and Analysis of Real-Time and Historical Drilling Data. Paper IADC/SPE 167960 presented at IADC/SPE Intelligent Energy Conference, Utrecht, Netherlands, Mar. 23-25.

David, R.M., Martinez, R.13., Aillud, G.S., (2014). Achieving Drilling Excellence Through Next Generation Workflows Enabled by by Integrating Historical Data and Real-Time Data. Paper SPE-172151-MS presented at Abu Dhabi International Petroleum Conference, Abu Dhabi, U.A.E., Nov. 10-13.

Van Oort, E., Griffith, J., Schneider, B., (2011). How to Accelerate Drilling Learning Curves., Increasing Drilling Efficiencies Through Improved Collaboration and Analysis of Real-Time and Historical Drilling Data. Paper IADC/SPE 140333 presented at IADC/SPE Drilling Conference, Amsterdam, Netherlands, Mar. 1-3.

Vermunt, J. K., & Magidson, J. (2002). Latent class cluster analysis. In J. A. Hagenaars & A. L. McCutcheon (Eds.), Applied latent class analysis (pp. 89-106). Cambridge, MA: Cambridge University Press.

* cited by examiner

METHOD AND APPARATUS FOR DRILLING A NEW WELL USING HISTORIC DRILLING DATA

FIELD

This disclosure relates generally to a method and apparatus for drilling a new well using drilling data from previously drilled wells.

BACKGROUND

Drilling companies seek ways to improve drilling speed and efficiency in order to reduce costs. It has been known for some time that when a set of wells is drilled in a similar area of the same formation, subsequent wells on that pad typically are drilled faster and more efficiently than initial wells, presumably because the drilling teams "learn" to drill faster by relying on past experience and trial and error methods.

However, no satisfactory methodical approach has yet been developed to exploit historic drilling data of previously drilled wells to improve speed and efficiency in drilling new wells. Known attempts consider too few drilling indicators such as only mechanical specific energy (MSE) and rate of penetration (ROP), and/or fail to adequately consider that the relationship between these indicators often change in different formations and as drilling depth increases. That is, the relationship between drilling indicators can be non-linear as a function of formation and depth, and perhaps other indicators not considered.

Therefore, it is desirable to provide a solution that addresses at least some of the deficiencies in the prior art.

SUMMARY

Figure 1:
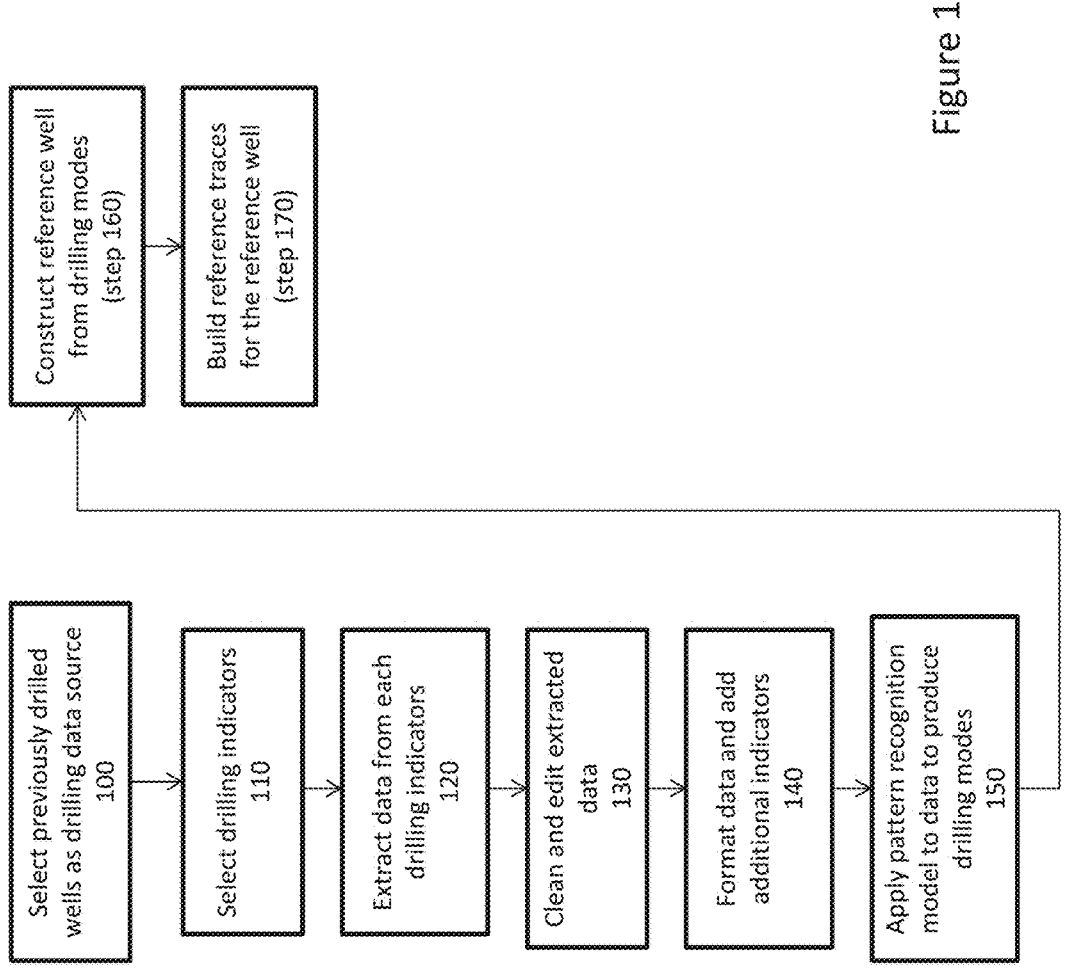
FIG. 1 is a flowchart illustrating steps in a method for generating the drilling plan for a reference well, wherein the drilling plan comprises drilling modes extracted from historic drilling data using a pattern recognition model.

According to one aspect, there is provided a method for drilling a new oil or gas well in a selected geographical location that comprises extracting drilling modes from historic drilling data obtained from a group of drilled wells in the selected geographical location using a pattern recognition model. Each drilling mode represents a distinct pattern that quantifies at least two drilling variables at a specified drilling depth. The method also comprises selecting a sequence of drilling modes at positions along a reference well as reference drilling modes that represent more efficient values for a selection of one or more of the at least two drilling variables compared to other extracted drilling modes; associating drilling parameter settings with the reference drilling modes; and drilling the new oil or gas well applying at least some of the drilling parameter settings.

The selected geographical region can be a pad or a formation. The selection of the one or more of the at least two drilling variables can comprise one or both of mechanical specific energy (MSE) and on-bottom rate of penetration (ROP). The selected reference drilling modes can represent maximum ROP or minimum MSE at each of the positions along the reference well. Alternatively, the selected reference drilling modes can represent faster ROP and lower MSE compared to at least some of the other extracted drilling modes at each of the positions along the reference well.

The step of extracting drilling modes can comprise extracting the historic drilling data from the at least two drilling variables of the group of drilled wells. The at least two drilling variables can be selected from a group consisting of: MSE, on-bottom rate ROP, hole depth, true vertical depth, weight on bit (WOB), differential pressure, rotary revolutions per minute (RPM) at surface or at the drill bit, rotary torque, bit size, bit type, bit wear convertible torque, torque, hook load, standpipe pressure, hook load, autodriller ROP set point, autodriller WOB set point, autodriller differential pressure set point, block height, inclination, tool face, flow, total pump output, total mud volume, drilling fluid type, drilling fluid rheology, geologic data, torque, drag, rotary drilling rig state, slide drilling rig state, and drilling-while-steering rig state.

The drilling data can be extracted from the at least two drilling variables using a comma separated value or LAS template extraction tool. The extracted drilling data can be cleaned, edited and formatted before applying the pattern recognition model to the drilling data. The step of cleaning and editing can comprise identifying and removing outlier values amongst the extracted drilling data. The step of formatting can comprise linearly transforming the at least two drilling variables to standardized values such that the at least two drilling variables are placed on a common scale thereby facilitating computation of variance-covariance matrices utilized by the pattern recognition model.

Using the pattern recognition model can comprise identifying a composite multivariate distribution in the extracted drilling data for each drilling variable included in the model, and un-mixing the composite multivariate distribution into sub-component multivariate distributions. Each of the sub-component multivariate distribution is one drilling mode. The pattern recognition model can be selected from a group consisting of: finite mixture modelling, mixture likelihood approach to clustering, model based clustering, mixture model clustering, factor-mixture models, probabilistic clustering, unsupervised learning, and latent cluster analysis.

According to another aspect, a method is provided for generating a drilling plan for drilling a new oil or gas well in a selected geographical region that comprises extracting drilling modes from drilling data obtained from a group of drilled wells in the selected geographical location using a pattern recognition model. Each drilling mode represents a distinct pattern that quantifies at least two drilling variables at a specified drilling depth. The method also comprises selecting a sequence of drilling modes at positions along a reference well as reference drilling modes that represent more efficient values for a selection of one or more of the at least two drilling variables compared to other extracted drilling modes; and generating the drilling plan of the reference well. The drilling plan comprises drilling parameter settings associated with the reference drilling modes, wherein at least some of the drilling parameter settings can be applied to drill the new oil or gas well.

According to yet another aspect, there is provided a computer readable medium having encoded thereon program code executable by a processor to produce a drilling plan for drilling a new oil or gas well in a selected geographical location. Producing the drilling plan by the executing the program code comprises extracting drilling modes from historic drilling data obtained from a group of drilled wells in the selected geographical location using a pattern recognition model, wherein each drilling mode represents a distinct pattern that quantifies at least two drilling variables at a specified drilling depth; selecting a sequence of drilling modes at positions along a reference well as reference drilling modes that represent more efficient values for a selection of one or more of the at least two drilling variables compared to other extracted drilling modes; and generating the drilling plan of the reference well, wherein the drilling plan comprises drilling parameter settings associated with the reference drilling modes. At least some of the drilling parameter settings can be applied to drill the new oil or gas well.

DETAILED DESCRIPTION OF EMBODIMENTS

The embodiments described herein relate generally to a method and an apparatus for drilling a new oil or gas well in a selected geographical location (e.g. a pad, or a formation), that uses historic drilling data from previously-drilled wells around that location to determine optimal drilling parameter settings for drilling the new well. A pattern recognition model is used to identify patterns in selected drilling variables in the drilling data. Drilling parameter settings associated with drilling variables having more optimal efficiency (e.g. low MSE, high ROP, high wellbore quality) are selected over drilling parameter settings associated with drilling variables having less optimal efficiency (e.g. high MSE, lower ROP, lower wellbore quality). The selected drilling parameter settings for each position along the wellbore form a drilling plan for a reference well, and this drilling plan can be used to drill the new well.

The following definitions are used in this application: "drilling variables" collectively refers to drilling parameters and drilling indicators. "Drilling parameters" are those drilling variables that typically are under direct control of the driller while drilling is being carried out (e.g., Weight on Bit (WOB), Revolutions per minute of the drill string and/or mud motor (RPM) and Pump rate (e.g., total pump output; TPO). "Drilling indicators" are those drilling variables that are outputs of the drilling process including, but not limited to, rate of penetration (ROP), mechanical specific energy (absolute; MSE and relative; rMSE) and torque.

The pattern recognition model (otherwise known as a finite mixture model, latent class analysis, and latent profile analysis) includes an algorithm that identifies patterns in the drilling variables that are included in the algorithm. These patterns are also referred to as "drilling modes". The model extracts the drilling modes from drilling variables selected from the historic drilling data. The historic drilling data can be depth-based or time-based. Each drilling mode represents a distinct pattern (i.e. archetype) that quantifies the average level of a drilling variable across all time or depth intervals of the wells included in the algorithm as historic data. That is, the drilling modes are different patterns or configurations of drilling parameters (e.g. WOB, RPM, pump rate) and drilling indicators (e.g., MSE, ROP, Torque) as well as any other drilling variables included in the algorithm. At the same time that the pattern recognition model identifies and extracts archetype drilling mode patterns, it assigns each incremental instance of historic drilling data to belong to one of these archetypes. Assignment of each instance of drilling data to an archetype pattern, or drilling mode is probabilistic; it is based on how precisely the pattern of each incremental instance of drilling data matches the archetype pattern.

Selecting the drilling parameter settings for each point in the well-bore is based on the following interpretation of the results produced by the pattern recognition model: i) the drilling modes quantify different levels of drilling indicators that relate to drilling efficiency (e.g., MSE, ROP, Torque) and the drilling parameter settings that were used to achieve the different efficiency levels; ii) the sequence in which the different drilling modes occur at different depths can be used to track learnings (i.e. transfer of information about drilling parameter settings used to achieve better levels of efficiency) within each well and from well to well; iii) the sequences of mode occurrence can also be used to track lack of information transfer (i.e. how information about more optimal drilling parameter settings was not transferred to different well depths or from well to well); and iv) that post-processing of the drilling modes can be used to build a drilling plan of a "reference well" that comprises drilling parameter settings (also referred to as "reference traces") for the next well to be drilled in the area. To build reference traces for the drilling plan, more efficient drilling modes are selected from among less efficient drilling modes that are identified by the algorithm. The drilling modes can be from the historic data from a single well or from all wells that are included in the historic dataset. The reference traces make recommendations for drilling parameter settings that would optimize or improve efficiency (e.g., ROP, MSE, well-bore quality) of the new well to be drilled in the area. The reference traces provide drilling parameter setting recommendations at a specified depth increment, e.g. 0.2 m (wherein "depth" also includes distance along lateral sections of the well). Simulations suggest that using the recommended drilling parameter settings from the reference well may yield more efficient drilling when drilling a new well.

Referring to FIGS. 1 to 16 and according to one embodiment, a computer-readable medium has encoded thereon program code executable by a processor to create a drilling plan for drilling vertical and lateral sections of a new well (reference well) using the pattern recognition model on drilling data obtained from a group of previously drilled wells in the area. The computer-readable medium can be any suitable non-transitory computer readable medium such as an optical disk or a hard drive. In particular, the computer-readable medium with the program code can be stored on a memory of a computing system, and a processor of that computing system can be operated to execute the program code. The computing system can be located at the new well drill site, or at some remote location in which case the drilling plan is transmitted to the new well drill site.

Referring particularly to FIG. 1, the program code when executed performs a number of steps to produce the drilling plan for the reference well. First, a group of previously drilled wells in the same formation are selected as the source of the drilling data (step 100); alternatively, the group of previously drilled wells can be in the same geographic area, provided that the rock lithology in the region is similar. A suitable number of previously drilled wells that provide sufficient drilling data can vary from formation to formation; at least one well should be used to define the vertical section of the reference well, and at least one well should be used to define the lateral section of the reference well. At least one well should be used to define the build section of the reference well, and at least one well should be used to define the type of drilling being done (rotary drilling, versus drilling while sliding or steering). The sections of the well can be identified visually from the corresponding data of the previously drilled wells, such as from tour sheets, or by selecting the sections through automatic detection using an external software package.

Then, a group of drilling variables are selected from the historic data from each of the selected group of wells (step 110). Table 1 below provides examples of possible drilling variables for which data values can be extracted:

TABLE 1

Drilling Variables

Variable Name

| | |
|---|---|
| 1. | Hole Depth |
| 2. | True Vertical Depth |
| 3. | Rate of Penetration (ROP) |
| 4. | On-bottom Rate of Penetration |
| 5. | Weight on Bit (WOB) |
| 6. | Differential Pressure |
| 7. | Rotary RPM (surface) |
| 8. | Rotary Torque |
| 9. | Convertible Torque |
| 10. | Hook load |
| 11. | Standpipe Pressure |
| 12. | AutoDriller ROP Set Point |
| 13. | AutoDriller WOB Set Point |
| 14. | AutoDriller Differential Pressure Set Point |
| 15. | Block Height |
| 16. | Inclination |
| 17. | Tool Face |
| 18. | Relative Mechanical Specific Energy (MSE) |
| 19. | Absolute MSE |
| 20. | Flow |
| 21. | Total Pump Output |
| 22. | Total Mud Volume |
| 24. | Drilling Activity |
| 25. | Drill Bit size |
| 26. | Type of drilling (rotary drilling, sliding, steering) |

Other drilling indicators that can be included in the algorithm include drilling fluid type and rheology; and geologic data (e.g. rock hardness, porosity, 'drillability', type of formation, etc.). Further drilling indicators can be derived from: physics-based models (e.g. torque and drag); data collected from wireline logs (e.g. well-bore quality, tortuosity, inclination, azimuth) and from well production ratings; drilling bit type and bit wear; number of bit pulls; reaming/circulating/washing data; and bottom-hole assembly data including mud-motor type, steering assembly type.

For each well, values for each drilling variable are extracted at a selected well distance interval or a selected time-based interval into an external data file, using a comma separated value (.csv) or industry-standard binary format file such as LAS using a template extraction or similar tool known in the art and which can be implemented in R, Matlab, Java, C++ or any programming language with file input/output capabilities (step 120). One or more preprocessing scripts can be used to add variable (vectors) into the .csv files ("data files"), including: 1) a Dossier ID to identify each well within the database; 2) a well identification variable that specifies the temporal order in which the wells were drilled; 3) a 'drilling event' indicator to identify the original order that each incremental instance of drilling activity occupied in the original .csv files (to facilitate data cleaning and post-analysis processing); 4) a formation top indicator vector that identifies formation top depths; 5) a bit diameter vector that identifies the bit diameter used to drill each depth interval; 6) a 'well section' indicator variable that identifies start of kick-off (end of vertical section) and end of the build (start of lateral section); 7) a mud motor speed to flow ratio (revolutions/litre) vector; 8) a vector that specifies the mud motors' maximum rated differential pressure (kPa); and 9) a vector that specifies the mud motors' maximum rated torque (Nm). After these vectors are added to the .csv files, the files are parsed into separate .csv files containing the vertical, lateral, build well sections as well drilling type (rotary drilling, sliding, steering), for cleaning and formatting.

The data files are then cleaned and edited (step 130). A number of data cleaning, editing and formatting scripts can be applied to prepare the drilling variables for analysis. When the drilling variables are time based, the time series for each indicator is parsed into depth intervals. For each separate well, the scripts can be applied to identify possible outlier values and/or random measurement errors that might produce errors in the algorithm. First, all variables to be included in the algorithm are plotted as depth-series or time-series graphs and as histograms for manual or automated visual inspection. A liberal editing criterion can be set: for example, values that fall outside of +/−4.5 standard deviations from the mean of the depth-series or time-series can be deleted and assigned missing value flags. Finally, a vector of estimated bit RPM (Surface RPM+mud motor RPM) can be calculated and added to the edited data files.

The cleaned and edited data files are then formatted and additional indicators may be added (step 140). The data files can be concatenated into two or more larger data files that comprise data from all the wells to be included in the algorithm (e.g. one data file for vertical sections, one data file for the lateral sections, one data file for build sections, one data file for sliding, one data file for steering, one data file for different bit sizes, etc.). These files can be concatenated so that the temporal order in which each well was drilled is preserved. The drilling variables to be analyzed by the pattern recognition algorithm are linearly transformed to standardized (z-score) values using the formula: (mean value of an indicator—actual value of an indicator at each depth interval/standard deviation of the indicator). This places all indicators onto a common scale (mean=0, standard deviation and variance=1.0) to facilitate computation of variance-covariance matrices utilized by the pattern recognition algorithm. The resultant edited data files will contain multiple depth intervals for each of the different well sections, bit sizes and type of drilling (rotary drilling, sliding, steering) of the historic wells.

Then, the program code executes a mixture model operation which applies the pattern recognition algorithm to the extracted drilling data for each of the data files from historic wells (step 150 In some embodiments, the selected drilling variables are: MSE, ROP, WOB), RPM, bit RPM, Differential Pressure; Convertible Torque; Standpipe Pressure; Flow; and Hole Depth.

Figure 2:
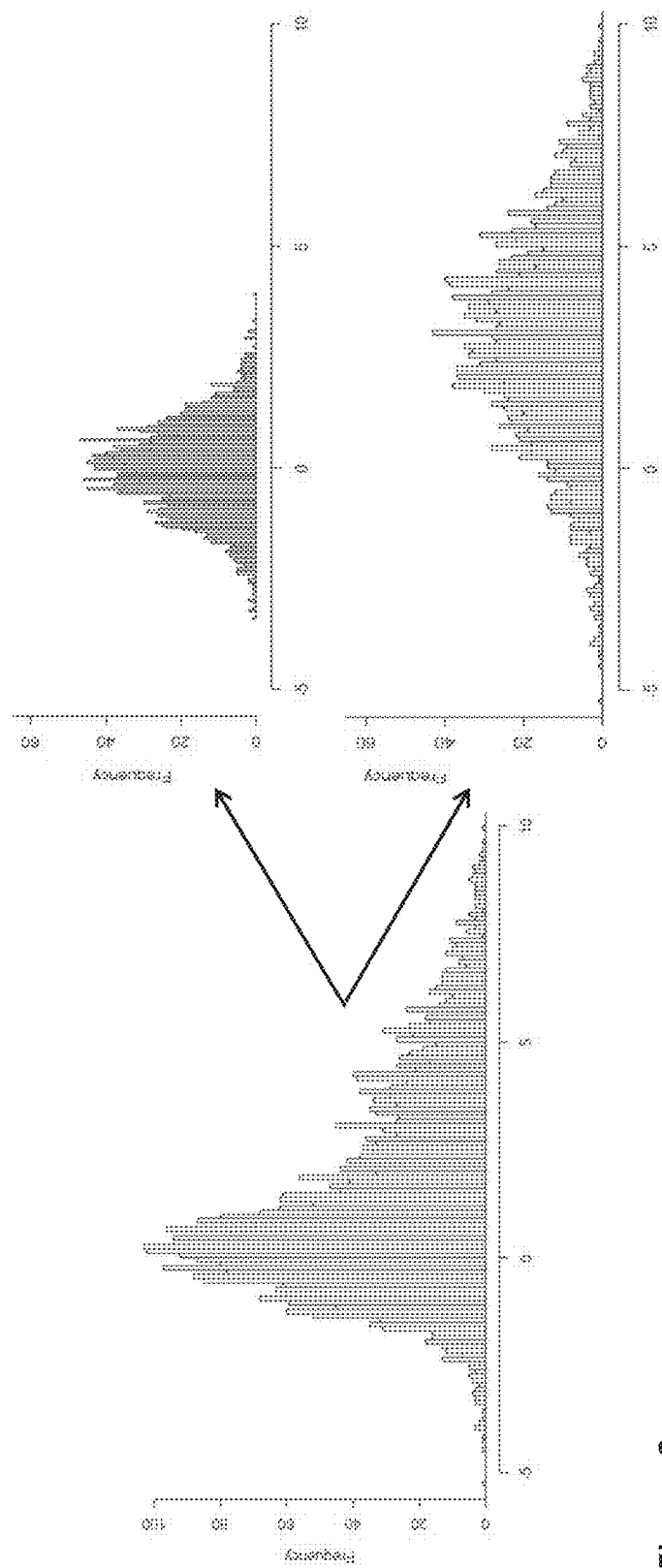
FIG. 2 are graphs showing a histogram before and after being un-mixed during a mixture modelling operation that extracts the drilling modes from the historic drilling data using the pattern recognition model.

As can be seen in FIG. 2, the extracted data set for each drilling indicator tends to have a non-normal distribution with non-normally distributed errors, due to different underlying processes that produce the data, i.e. each underlying process comprises a distribution that together with the distributions of the other underlying processes form a composite distribution that defines the non-normal multivariate distribution of the extracted data. The pattern recognition model serves to "un-mix" the composite multivariate distribution into its component multivariate distributions. Each component multivariate distribution is herein referred to as a "drilling mode".

The number of different component multivariate distributions in each composite multivariate distribution is unknown, and the pattern recognition model carries out a form of pattern recognition algorithm and/or cluster analysis to recognize individual sets of more normally-shaped distributions that form patterns in the drilling variables included in the algorithm. The pattern recognition model can use one or more available and known algorithms, such as those disclosed in the fields of: finite mixture modelling, mixture-likelihood approach to clustering (e.g. McLachlan, G. J., & Basford, K. E., (1988). *Mixture Models: inference and Application to Clustering*. New York: Marcel Dekker.; Everitt, B. S. (1993). *Cluster Analysis*. London: Edward Arnold.), model-based clustering (e.g. Banfield, J. D., & Raftery, A. E. (1993). "*Model-based Gaussian and non-Gaussian clustering*", Biometrics, 49, 803-821.), mixture model clustering (e.g. Jorgensen, M. & Hunt, L. (1996). "Mixture-model clustering of data sets with categorical and continuous variables," *In Proceedings of the Conference ISIS '96, Australia*, 1996, pp. 375-84.), factor-mixture models (Lubke, G. H., & Muthen, B. (2005). *Investigating population heterogeneity with factor mixture models*, Psychological Methods, 10(1), 21-39.), probabilistic clustering (Bacher, 2000), Bayesian classification (e.g. Cheeseman, P., & Stutz, J. (1995). "*Bayesian classification (Autoclass): Theory and results.*" In U. M. Fayyad, G. Piatetsky-Shapiro, P. Smyth, & R. Uthurusamy (eds.) *Advances in Knowledge Discovery and Data Mining*. Menlo Park: The AAAI Press.), unsupervised learning (e.g. McLachlan, G. J., & Peel, D. (1996). "*An algorithm for unsupervised learning via normal mixture models.*" In D. L. Dowe, K. B. Korb, & J. J. Oliver (eds.), Information, Statistics and Induction in Science. Singapore: World Scientific.) and latent class cluster analysis (e.g. Vermunt, J. K., & Magidson, J. (2002). *Latent class cluster analysis*. In J. A. Hagenaars & A. L. McCutcheon (Eds.), Applied latent class analysis (pp. 89-106). Cambridge, Mass.: Cambridge University Press.).

In general, the algorithm identifies archetype patterns by minimizing the variance among each instance of observed data assigned to that pattern and/or by maximizing the variance among the different pattern archetypes. Model parameters (which describe the archetype patterns and probabilistic assignments of each cross-section of observed data to the archetype patterns) are estimated using maximum likelihood (minimizing a log-likelihood function) or using Markov Chain Monte Carlo methods to sample from the multivariate posterior distribution.

In one embodiment, the formula for the basic model is provided by Vermunt and Magidson and can be expressed as:

$$f(y_i) = \sum_{k=1}^{k} \pi_k f_k(y_i | \theta_k) \quad \text{[equation 1]}$$

where, $y_i$ are the set of observed values for a cross-section of drilling variables, k is the number of drilling modes, $\pi_k$ is the probability that the set (cross-section) of drilling variables belongs to drilling mode k. Equation 1 states that the distribution of $y_i$, given the model parameters, $\theta_k$, is assumed to be mixture of drilling mode-specific densities, $f_k(y_i|\theta_k)$. The distributions of the variables within drilling modes can be of a variety of forms (e.g., Gaussian or t; Asparahouv & Muthen, 2014).

Here the model parameters, θ, include a vector of mean drilling variable values, $\mu_i$, for drilling mode k, a vector of structural coefficients defined by covariates (here, depth), Bk, that indicate the relative differences of how the drilling modes relate to depth, and a variance-covariance matrix of drilling variables, $\Sigma_k$, for drilling mode k. The diagonal of this matrix contains estimated variances (ε) for the drilling variables and the off-diagonal contains estimated co-variances (ε,ε') among the drilling variables for drilling mode k. $\Sigma_k$ can be constrained to be equal across the drilling modes or can be different for each drilling mode. Similarly, Bk can be excluded by disregarding depth, or on the other hand, it can be augmented with additional structural coefficients by including other covariates in the model (e.g., formation type).

Figure 3:
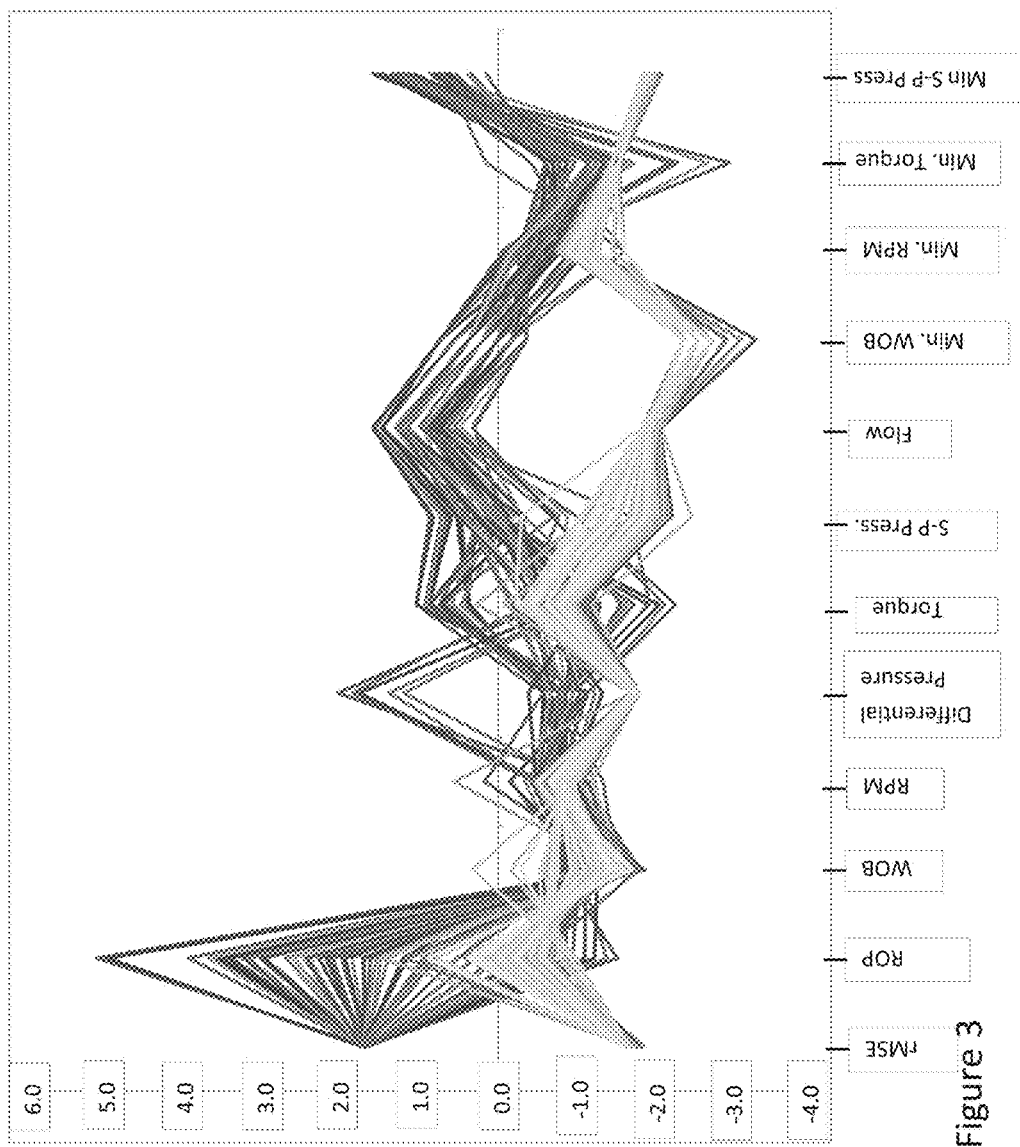
FIG. 3 is a graph of cross-sectional instances of drilling data (comprising twelve different drilling indicators that serve as input into the mixture modelling operation.

The pattern recognition model identifies an optimal number of representative (i.e., archetype) patterns (here, different drilling modes) that are likely to underlie the data. As can be seen in FIG. 3, the optimal number of drilling modes can be presented graphically, and be identified by visual inspection and interpretation, striking a balance between model complexity and parsimony (where more parsimonious models are preferred) as well as using statistical indicators, including, but not limited to −2 log likelihood values, Akaike's Information Criterion (AIC), Bayesian Information Criterion, and Sample-size Adjusted Bayesian Information Criterion (SABIC). When Markov-chain Monte Carlo (MCMC) algorithms are used to identify the optimal number of modes, multiple chains can be run and the ratio of within-chain to between-chain variance (the b-hat statistic) as well as the Deviance Information Criterion (DIC) can be used.

As the pattern recognition model extracts the optimal number of drilling modes (archetype patterns), simultaneously, the probability that the each instance of the drilling variables from the data files belongs to each archetype pattern is computed. The data from a depth or time interval with the highest probability of belonging to an archetype pattern will be assigned to that archetype. Thus, the drilling modes that have been identified each represent a distinct pattern (drilling mode) of the selected drilling variables, and each drilling mode contains a certain number of instances of historic depth or time-based drilling data that most closely match a drilling mode's archetype pattern. This allows a user to: i) identify modes with the different levels of efficiency ii) identify the depths where they occur; iii) use the historic depth-interval or time-interval data from high efficiency modes to make recommendations for optimal drilling parameter settings; and iv) use the drilling modes to quantify 'learning' (information transfer as well as lack of information transfer) within each well and from one well to the next.

Figure 4:
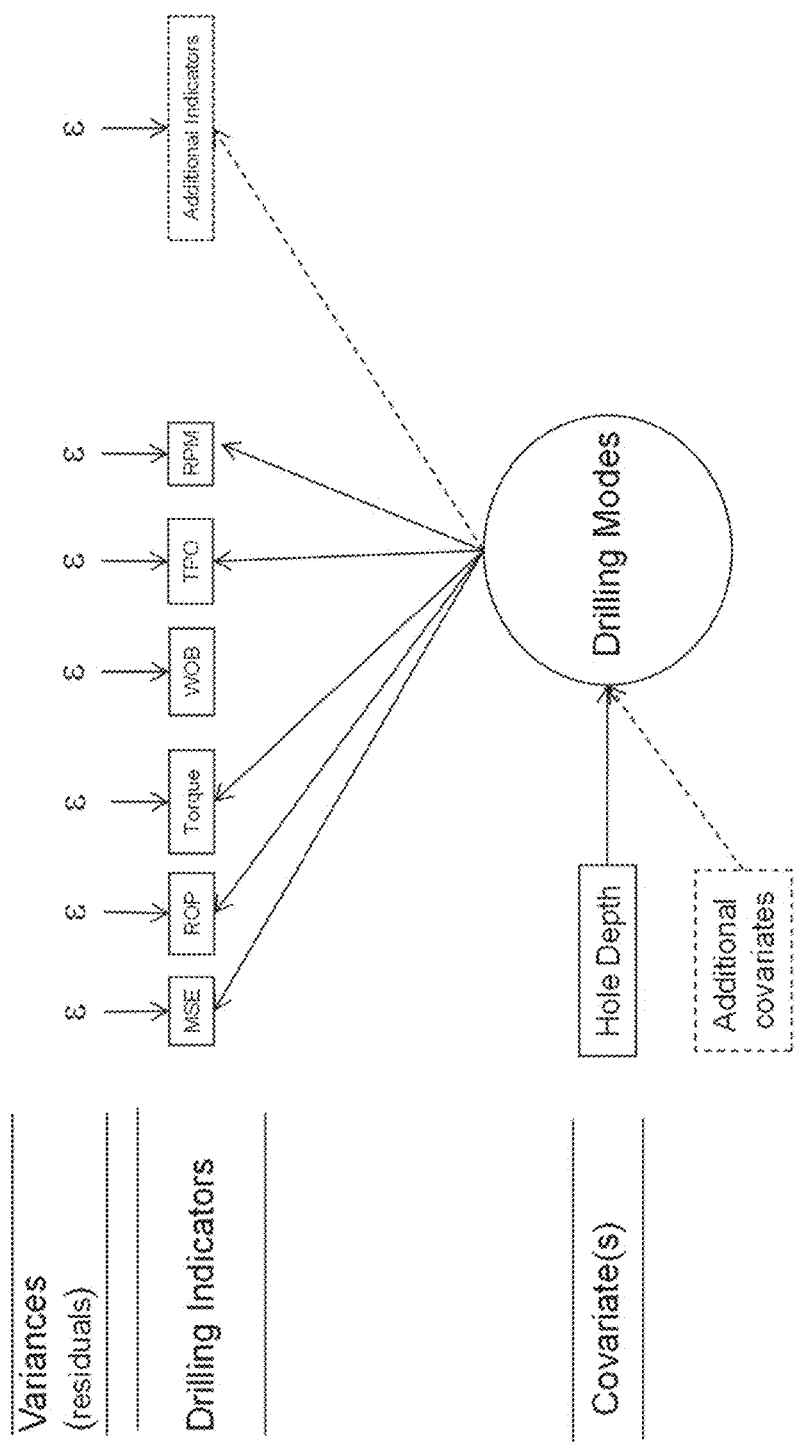
FIG. 4 is a graphical representation of the mixture modelling operation applied to the historic drilling data.

Referring to FIG. 4, the pattern recognition model is presented graphically wherein drilling modes are represented by the circle. The epsilons ($\varepsilon_i$, residuals) are error terms and the arrows show that errors influence the values of the different drilling variables (shown the rectangular boxes). These residuals occur due to random errors of measurement of the drilling variables, errors in modeling, errors in sampling or other processes that are not yet recognized. The drilling variables are allowed to have one of many variance-covariance structures, which is defined during the modeling process. Depth is included in the model as a covariate, and the drilling modes are allowed to have a statistical (i.e., probabilistic) relationship with depth; that is, different drilling modes might occur at different depths, and the strength of the relationships between the drilling modes and depth is quantified using a set of regression coefficients. The arrows from the drilling modes to the drilling variables show that the drilling variables are regressed onto the drilling modes, which are represented by a system of linear or nonlinear regression equations.

The pattern recognition model is a flexible analytic framework for identifying drilling modes. Different error structures can be investigated and selected, different drilling variables can be included or excluded, different covariates can be included or excluded, and the number of drilling modes can be increased or decreased based on examining the various criteria described above as well as the overall goal of the pattern identification project. Another advantage of the pattern recognition model, is that the mixture distributions are not only 'un-mixed' into their underlying component distributions, but the structural relations among the drilling indicators are also 'un-mixed.' For example, the relationship between on-bottom ROP and WOB might change from formation to formation, or change over depth of a well (or set of wells); the relationship might be non-linear. By applying the pattern recognition model and identifying distinct drilling modes, non-linear and linear structural relations among the drilling variables can be 'un-mixed' into their simpler counterparts. This is expected to facilitate more precise, second-stage modeling approaches for simulation, prediction and optimization. Optionally, some or all of the drilling variables may be weighted differently when the pattern recognition model is applied, by applying different weighting schemes to different drilling variables; for example, the ROP and MSE may be weighted more heavily and the other drilling variables weighted more lightly.

Figure 9:
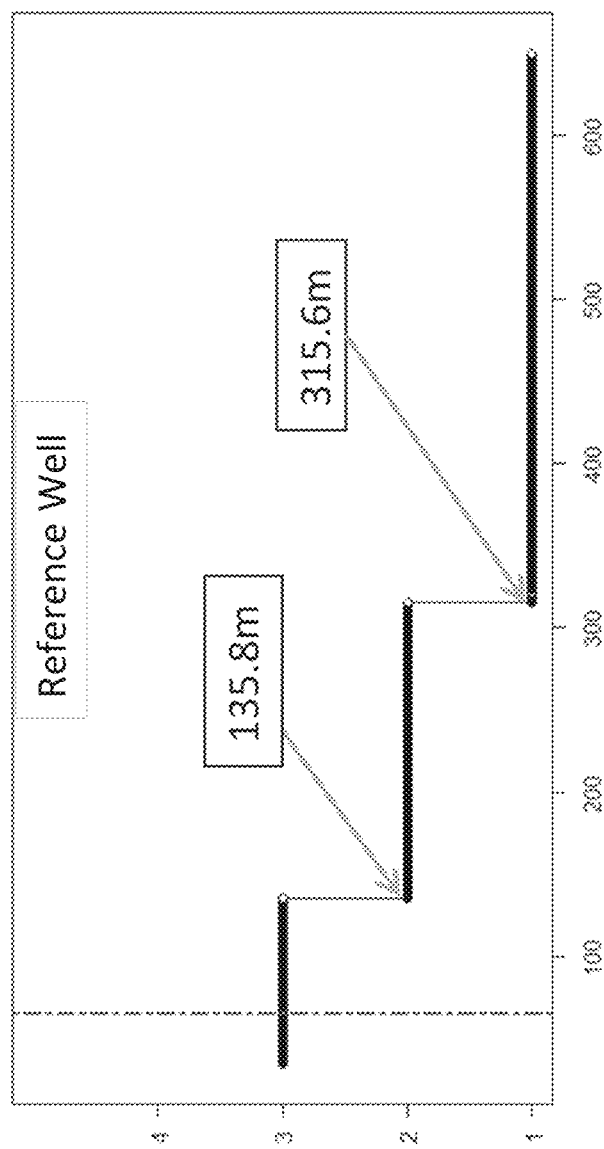
FIG. 9 is a graph of a reference well and a selected reference mode at different depths of the example reference well.

The extracted drilling modes are then analyzed according to the approach described above, and the most efficient modes (reference modes) are preferably selected to construct the reference well. In one embodiment, drilling efficiency may be improved in a group of wells by using the drilling modes to construct a reference well and to identify drilling parameter settings that maximize efficiency along the depth intervals of the reference well. In some embodiments, modes with faster ROP and/or lower MSE are selected as the reference modes to construct the reference well using depth intervals taken from all wells included in the analyses (step 160). FIG. 9 shows an example reference well wherein three different modes were selected as reference modes for three different depth intervals (Mode 3 for depths between 0-135 m, Mode 2 for depths between 135-315.6 m, and Mode 1 for depths greater than 315.6 m) of the reference well.

Figure 10:
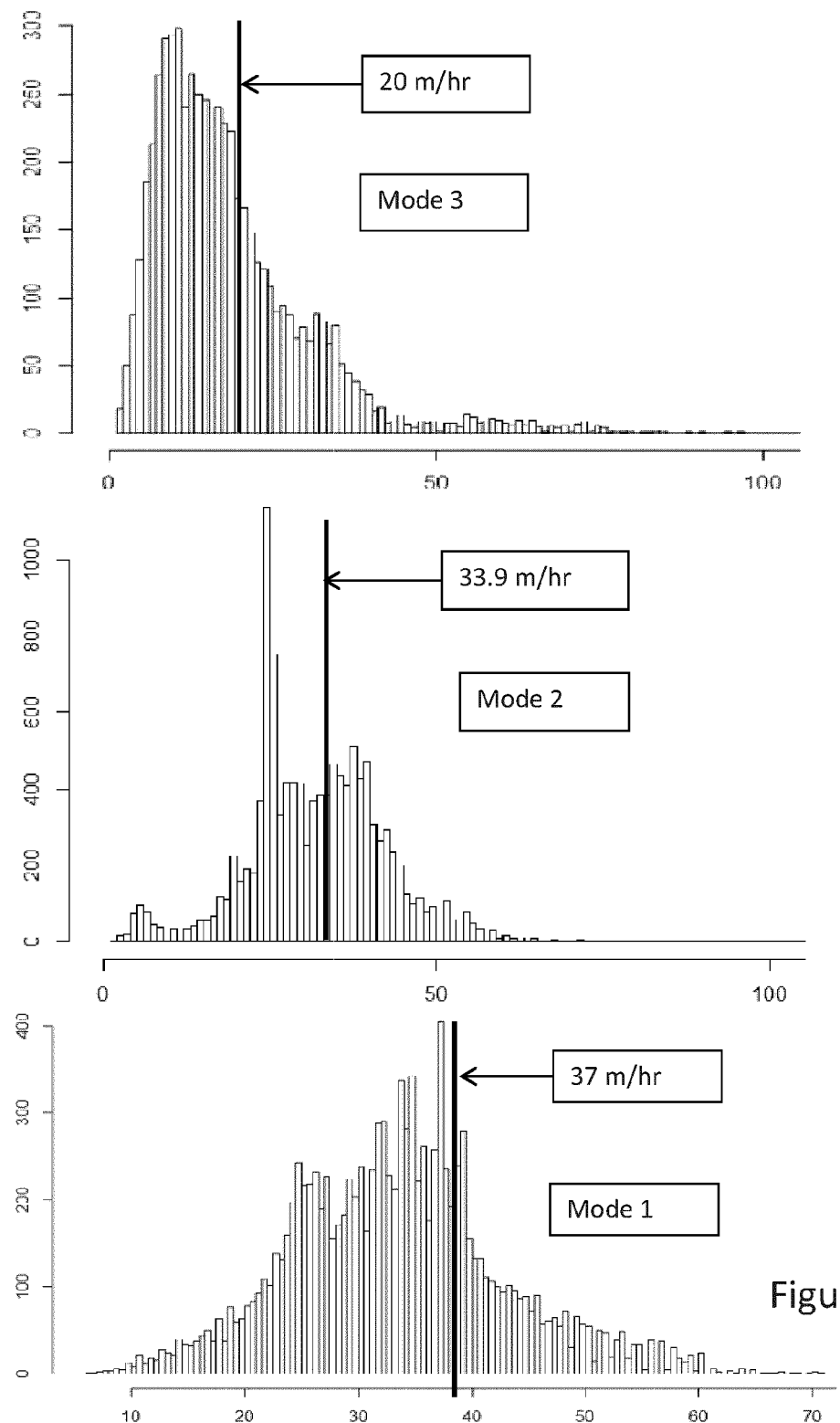
FIG. 10 are histograms of on-bottom rate of penetration (ROP) values for modes 3, 2 and 1 and cut-points used to build reference traces for the vertical section of the example reference well.

After the reference well has been constructed, reference traces are built (step 170) to complete the drilling plan. The histograms of ROP values within each mode used in the reference well are first examined. In particular histograms may be examined in order to assess the results of the 'un-mixing' process. FIG. 10 shows exemplary histograms of on-bottom ROP values for three drilling modes. ROP cut-points on these distributions are selected and historic drilling data for each mode that are associated with ROP values equal to or greater than these cut-points are used for the reference traces. As noted above, these reference traces define the recommended drilling parameter settings for each position along the reference well, and this information is packaged in a drilling plan that can be used by a driller to drill a new well.

EXAMPLE

A drilling plan was created for a reference well comprising vertical sections built from historic drilling data from 11 wells. The vertical sections of each well included a 311 mm bit diameter section (while this example uses a 311 mm bit section, the method is applicable to other sections of other bit sizes, to build sections to lateral sections, to rotary drilling and to sliding or steering). The well number, release date, depths to end of the 311 mm bit diameter sections and the average on-bottom rates of penetration are shown in Table 2. Wells are listed in order they were drilled, based on the release dates listed in Tour sheets. Depths marking the ends of the 311 mm bit sections were identified from Tour sheets. NOV 8", mud motors were used in the 311 mm sections. Approximate depth of formation tops were identified from a stick diagram provided by our industry partner. The number of bits used to drill these vertical sections ranged from 3 to 5, and the number of bits used to drill the lateral sections ranged from 1 to 4.

TABLE 2

| Well Number | Release Date | End of 311 mm Section (m) | Average ROP (m/hr) |
|---|---|---|---|
| 1 | Dec-22-2012 | 644 | 33.95 |
| 2 | Jan-13-2013 | 640 | 30.03 |
| 3 | Feb-13-2013 | 645 | 31.39 |
| 4 | Mar-28-2013 | 643 | 19.54 |
| 5 | Sept-05-2013 | 650 | 32.61 |
| 6 | Oct-04-2013 | 632 | 28.77 |
| 7 | Nov-15-2013 | 638 | 32.10 |
| 8 | Dec-29-2013 | 642 | 31.77 |
| 9 | Jan-31-2014 | 640 | 33.59 |
| 10 | Mar-04-2014 | 640 | 32.41 |
| 11 | Apr-01-2014 | 643 | 22.52 |
| MODEL-BASED PREDICTIONS | | | 40.8 |
| % Speed-up (compared to fastest well) | | | 20.2% |

For each well, depth-based, 0.2 m resolution data were extracted using a comma separated values (.csv) template extraction tool. Duplicate depth readings were eliminated during extraction. For each well, the drilling variables in Table 1 were extracted.

After the data was extracted, the data was cleaned and edited according to step 130 of the method, and formatted according to step 140 of the method. In particular, the .csv files were concatenated into one larger .csv files that comprised historic drilling data from all eleven wells These files were concatenated so that the temporal order in which each well was drilled was preserved (e.g., well 1 was placed first, well 2 was placed second, and so on). The drilling variables to be analyzed by the pattern recognition model were linearly transformed to standardized (z-score) values using the formula: (mean value of an indicator—actual value of an indicator at each depth interval/standard deviation of the indicator). This placed all indicators onto a common scale (mean=0, standard deviation and variance=1.0) to facilitate computation of variance-covariance matrices utilized by the mixture models. The edited data files included 30738 0.2 m depth intervals for the 311 mm bit diameter well sections.

Then, the pattern recognition model was applied according to step 150 of the method. The following 10 drilling variables were included in the mixture models: 1) MSE; 2) ROP; 3) WOB; 4) Bit RPM (maximum value in the depth interval) 5) Differential Pressure; 6) Torque; 7) Standpipe Pressure (Maximum value from the depth interval); 8) Bit RPM (Minimum value in the depth interval.); 9) Standpipe Pressure (Minimum value in the depth interval); and 10) Hole Depth.

Figure 5:
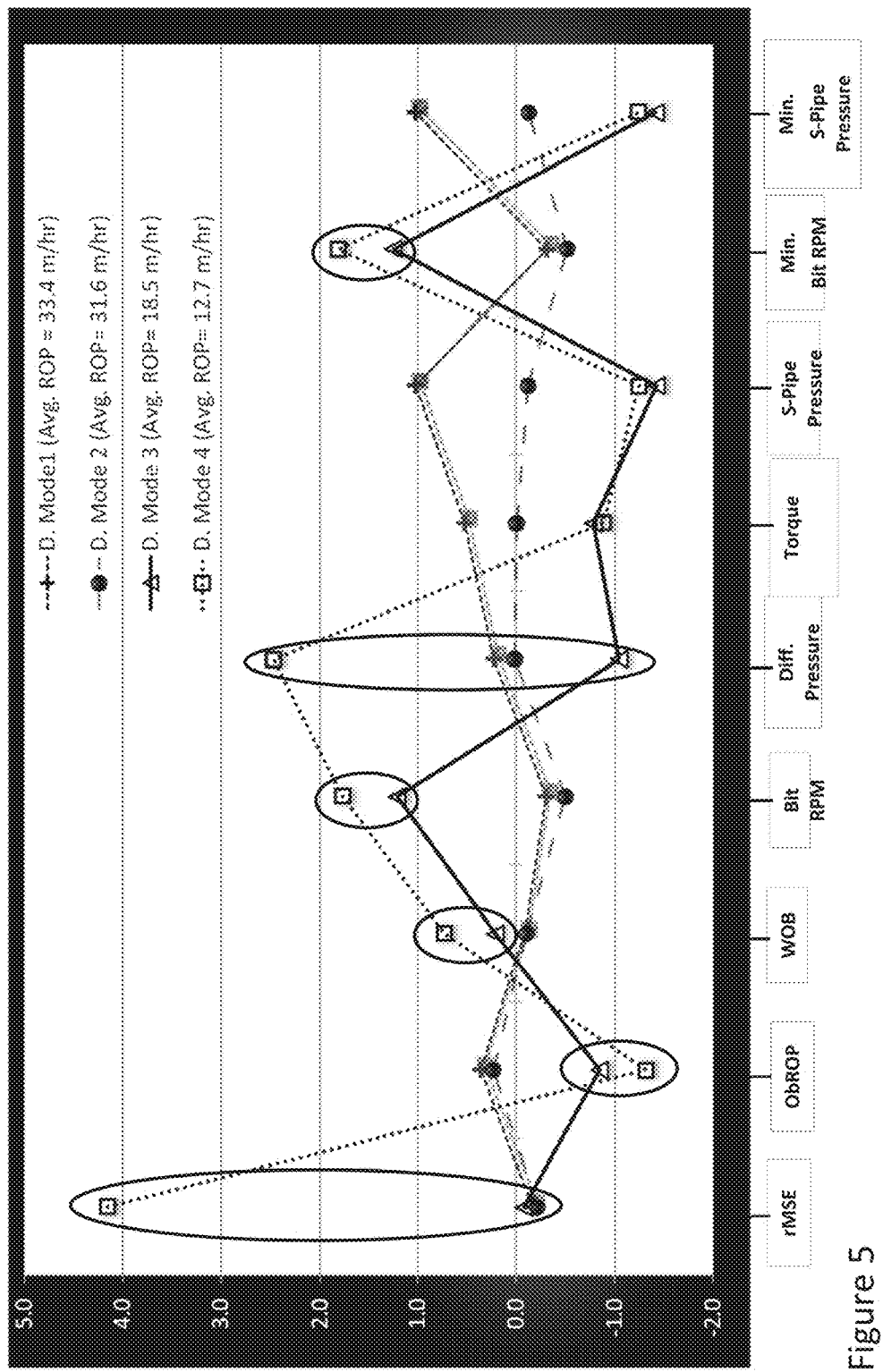
FIG. 5 is a graph of four drilling modes for nine drilling indicators extracted from the data from the vertical sections of eleven historical wells, for producing an example reference well by an embodiment the method.

Results. The resulting drilling modes extracted from the 311 mm bit diameter vertical section is shown in FIG. 5. Only a very simple variance (not covariance) structure for the drilling variables was determined by running competing models and comparing Bayesian Information Criterion (BIC) values. Models with lower BIC values are preferred to models with higher BIC values. After data editing, which excluded depth intervals above 35 m, 30738 intervals from 10 drilling variables were available from the 311 mm bit diameter sections for analysis.

Best number of drilling modes and interpretation. Modeling began by assuming a two-mode solution and running the model. This was repeated for models that assumed 3, 4 and 5 modes. The 4-mode model best fit the data and provided interpretable modes. These are shown graphically in FIG. 5. The modes are numbered 1 through 4 and correspond (inversely) with on-bottom ROP. Mode 1 has the highest on-bottom ROP and Mode 4 has the lowest. For interpretation, consider Modes 3 (solid line, triangles) and 4 (dotted line, squares). The ellipses show that compared to Mode 4, Mode 3 is distinguished by a pattern where (with respect to the Y-axis) rMSE is lower, on-bottom ROP is higher, and WOB, RPM, Differential Pressure and Min. RPM all are lower. There was very little, if any difference between Torque, Standpipe Pressure or Minimum Standpipe Pressure. Because the drilling indicators are standardized, zero is the mean of the data and the Y-axis is in standard deviation units.

Drilling mode efficiency metrics. Modes 3 and 4 differ substantially in efficiency, whereas Modes 1 and 2 differ less. The most depth intervals are classified as Mode 2 and the least are classified as Mode 4.

Figure 6A:
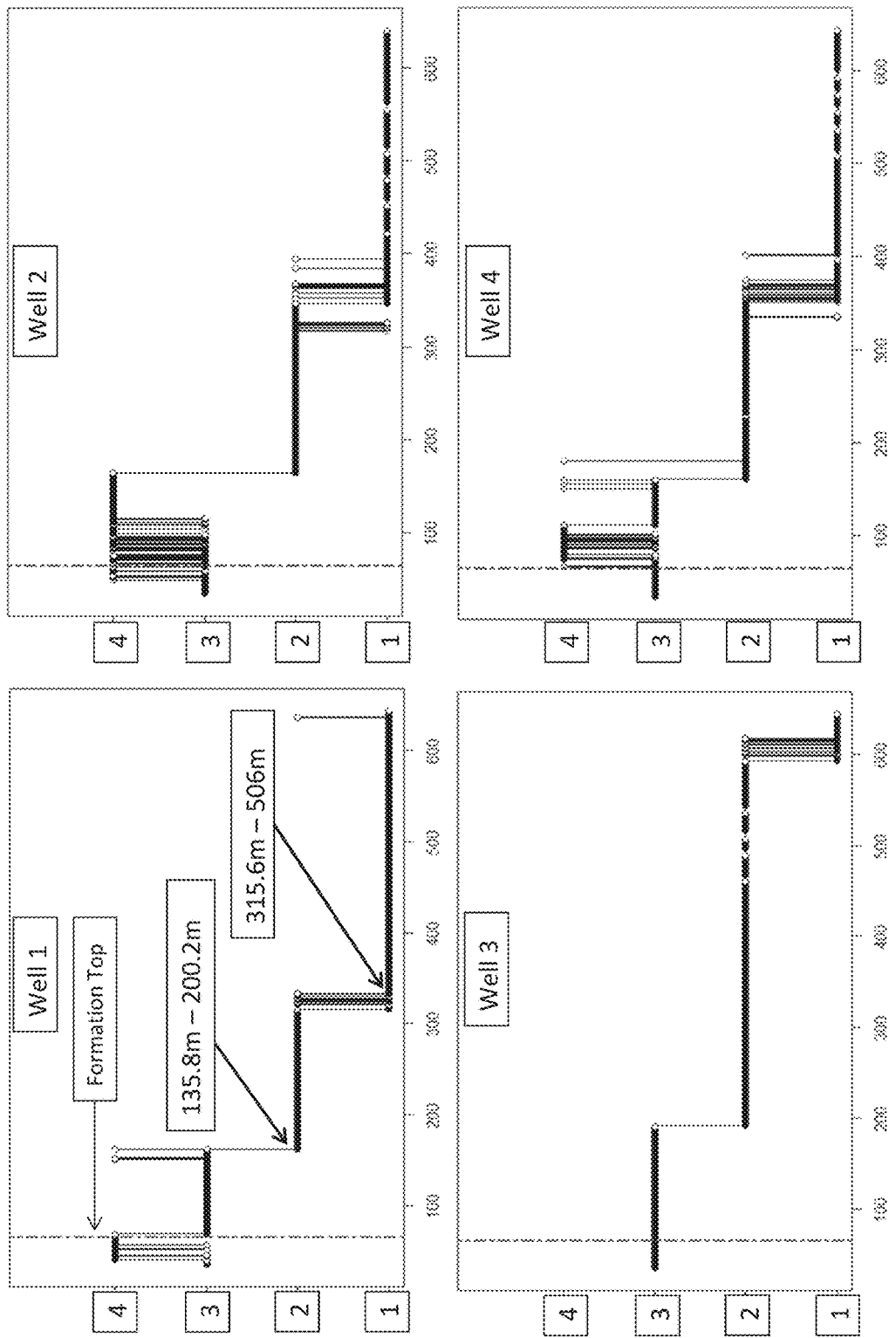
FIGS. 6A, 6B and 7 are graphs of drilling modes (Y-axis) and their locations at each depth (X-axis) for the vertical sections of the eleven historic wells.
Figure 6B:
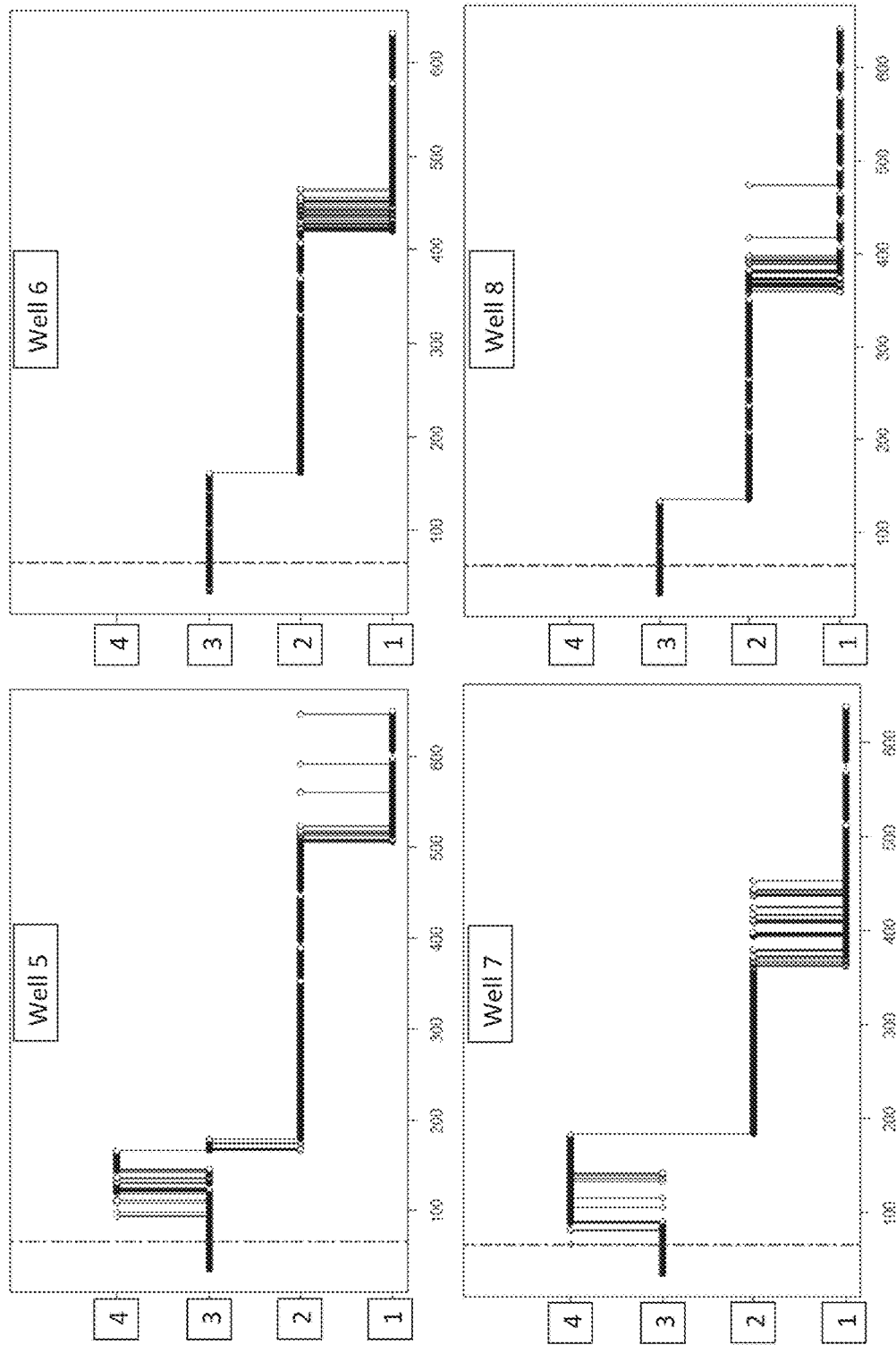
Figure 7:
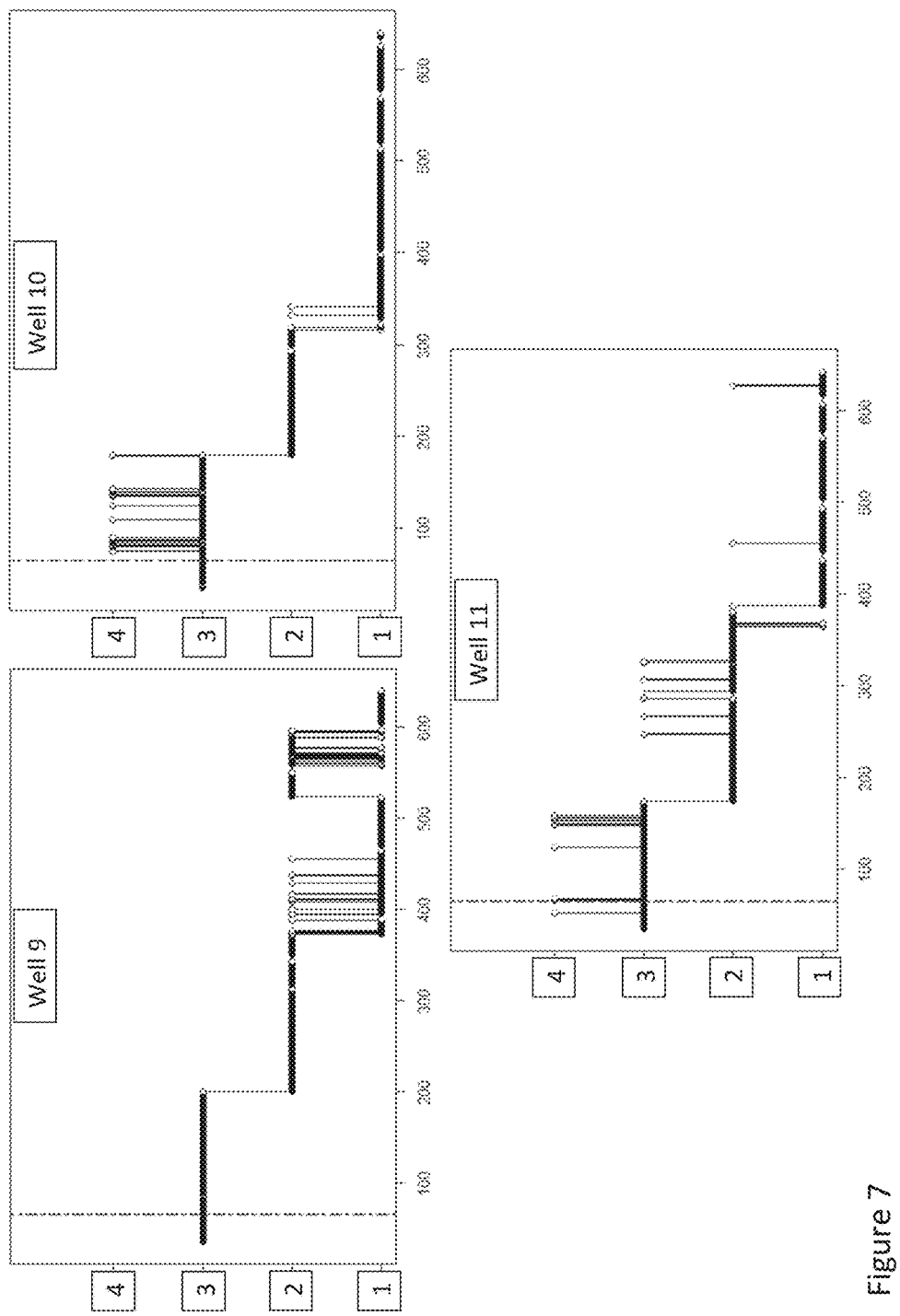

Drilling modes and depth. FIGS. 6A, 6B and 7 show that the drilling modes map strongly to depth. Modes 3 and 4 occur early in the wells (35 m to 135.6 m), mode 2 occurs next starting at 135.8 m to 200.2 m, and mode 1 occurs last starting at 315.6 m to 506 m, depending on the well. Note that the vertical dashed line marks the approximate location of the first formation top. Formation tops are marked this way in all similar graphs that follow.

Drilling modes (311 mm bit sections) and information transfer (learning). Examining the change in modes across wells demonstrate that the modes capture learning. For example, mode 4 (average ROP=12.7 m/hr) occurs in both wells 1 and 2, but mode 4 does not occur in the third well. In the third well, Mode 4 is completely replaced by mode 3 (average ROP=18.5). The change in modes across wells also shows lack of information transfer; mode 1 occurs more frequently in wells 1 and 2 (53.10% and 44.9% of depth intervals, respectively), but occurs for only 7.96% of depth intervals in well 4.

Figure 8A:
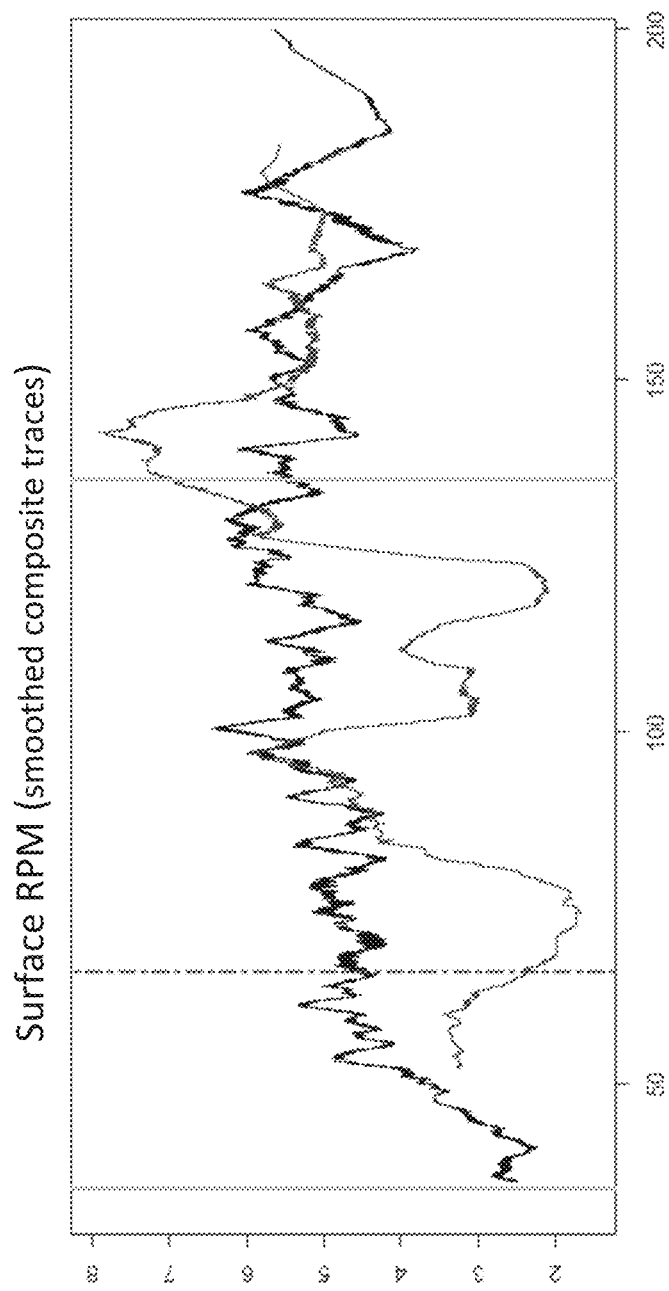
FIGS. 8A-8C are graphs of smoothed traces of various indicators for different modes for the vertical section of the example reference well.
Figure 8B:
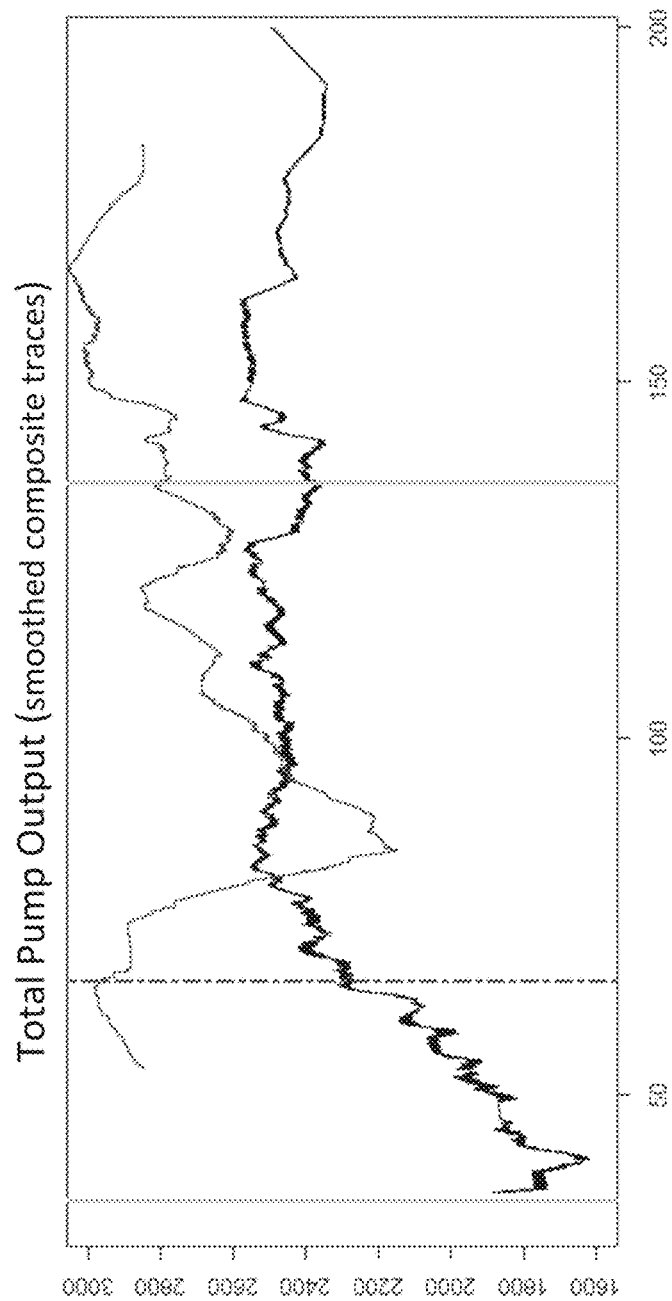
Figure 8C:
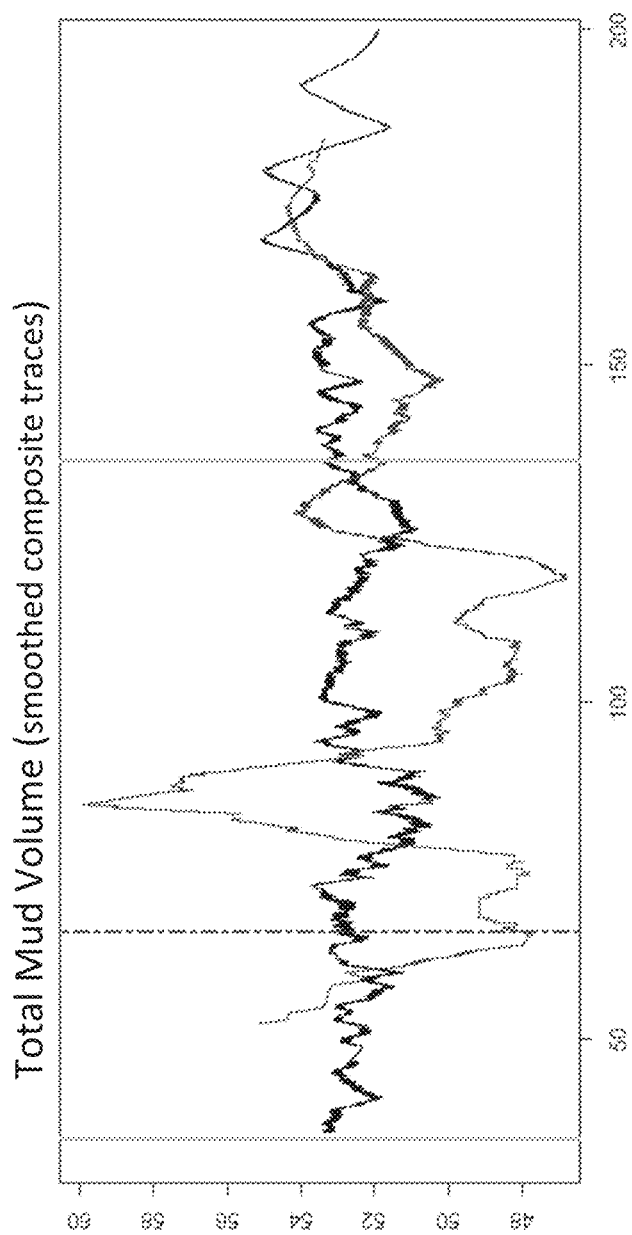

Another potential advantage of the method is that the traces for indicators not included in the mixture model may be available for visualization/and or further analysis. For example, FIGS. 8A-8C show smoothed composited traces for surface RPM, Total Pump Output and Total Mud Volume. Drilling modes and improving efficiency: building the reference well. Step 160 of the method was applied to create the reference well. In this example for the 311 mm bit diameter section, Mode 3 was selected as the reference mode for depth intervals from 35 m (shallowest depth included in the analyses) to 135.8 m (first occurrence of Mode 2). Mode 2 is selected for depth intervals 135.8 m to 315.6 m (first occurrence of Mode 1). Mode 1 is used to generate the reference well from 315.6 m to the end of the 311 mm bit diameter section (approximately 649.8 m). The constructed reference well is shown in FIG. 9.

Figure 11:
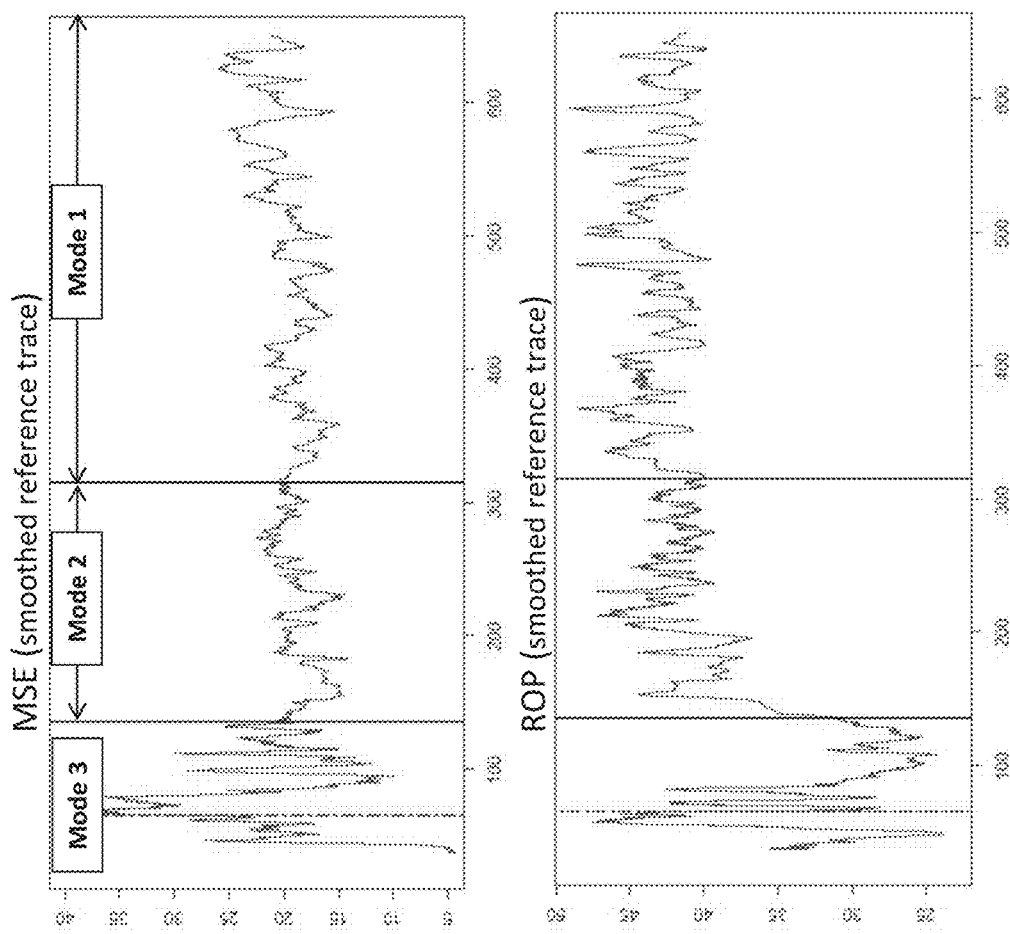
FIGS. 11 to 16 are reference traces for different indicators extracted from the data from the of the vertical section of the example reference well.
Figure 12:
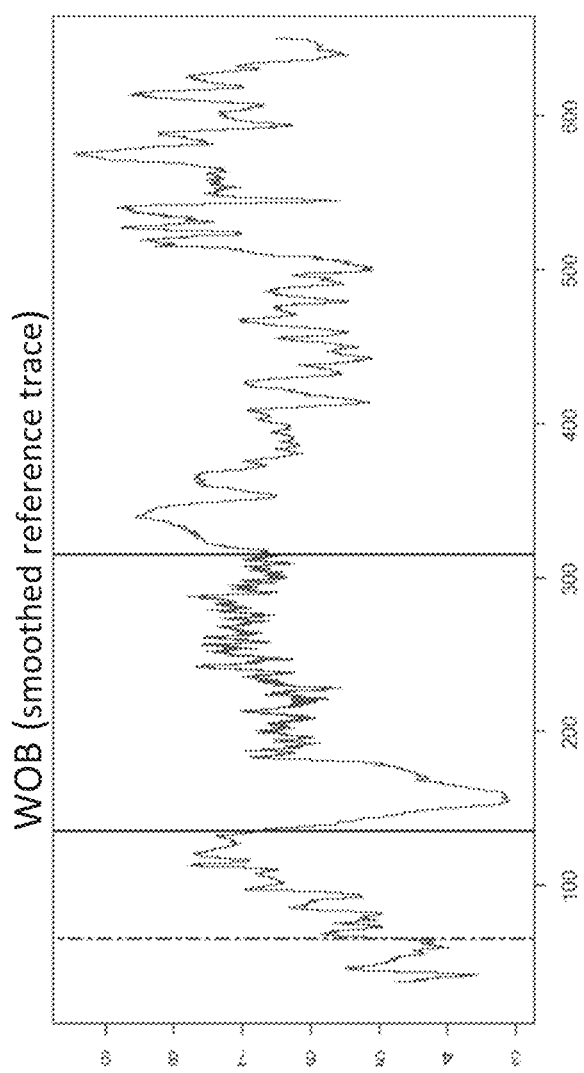
Figure 13:
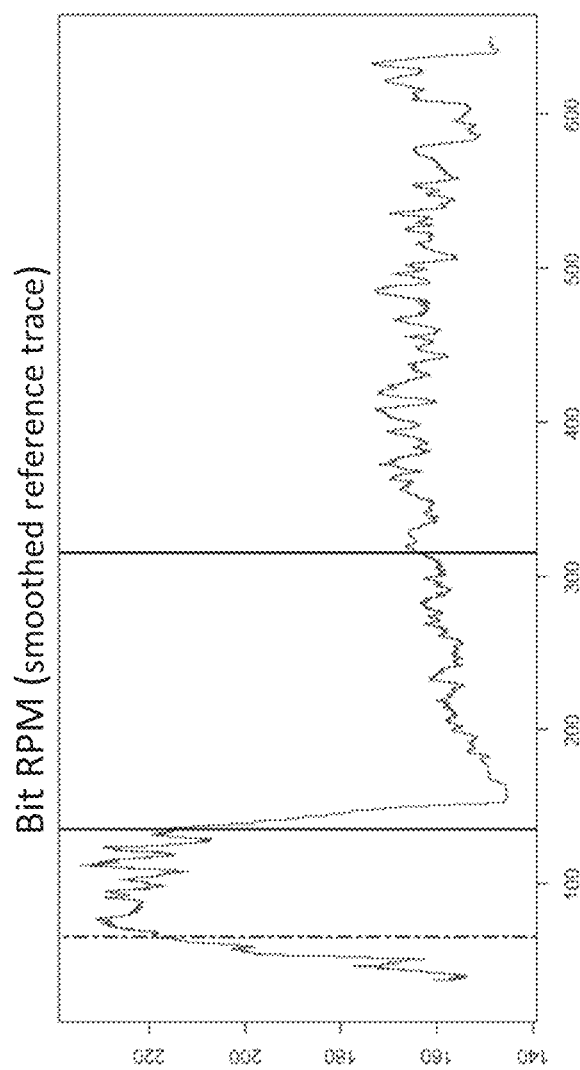
Figure 14:
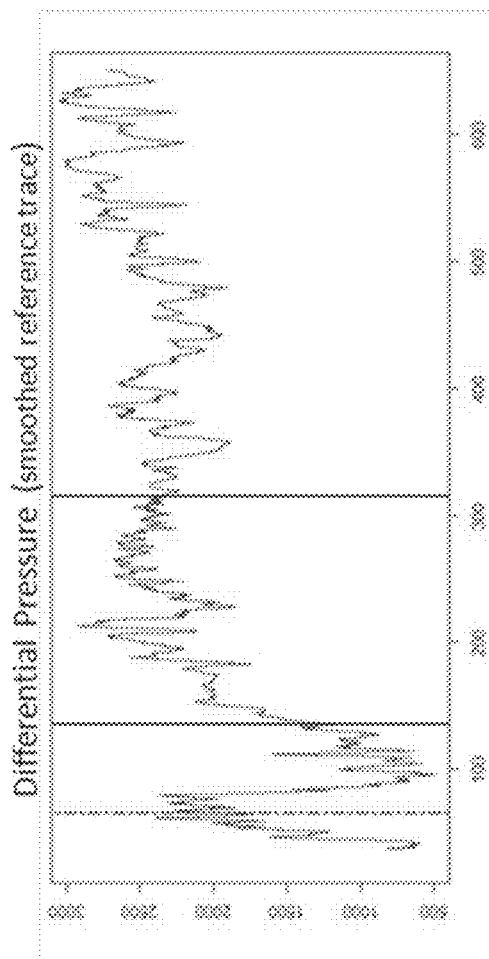
Figure 15:
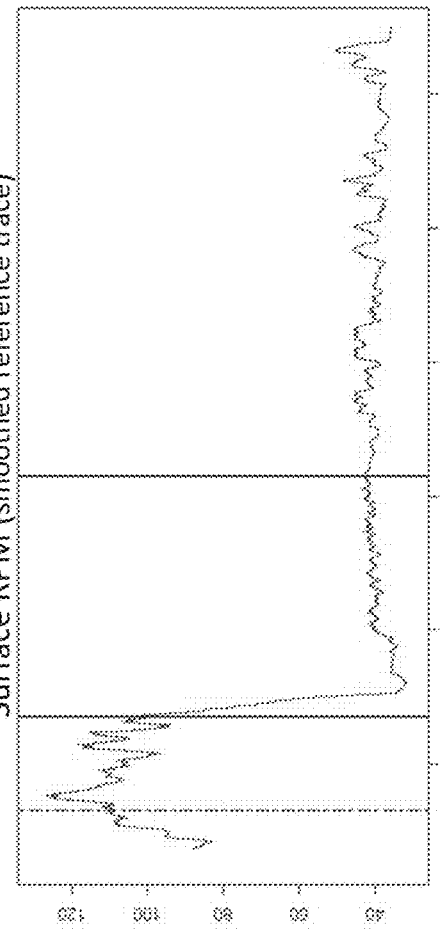
Figure 16:
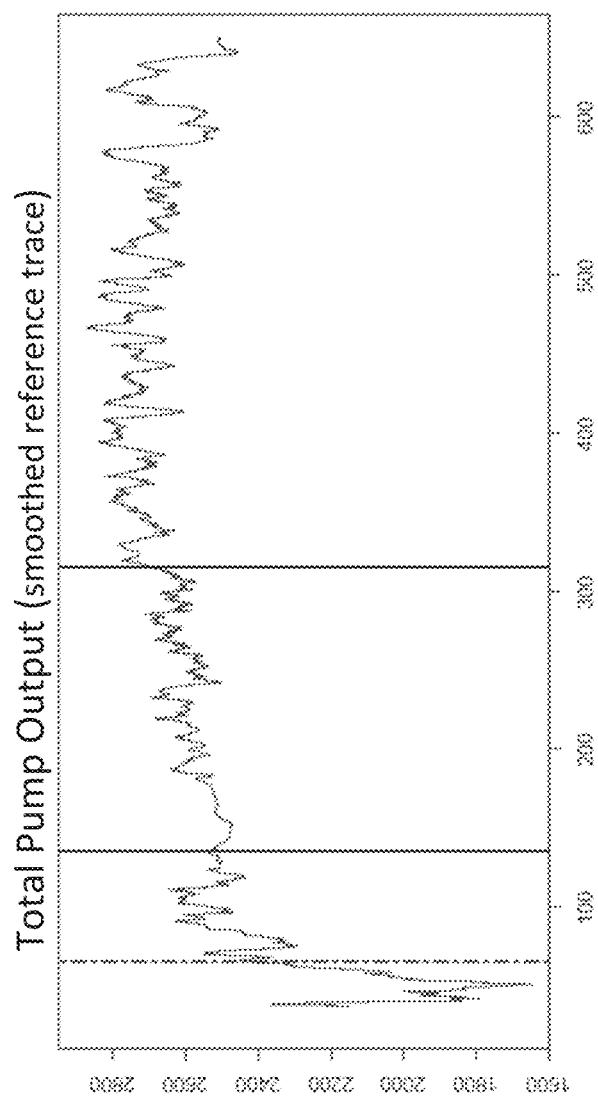

Improving efficiency for future wells on the pad: building reference traces. Step 170 of the method was applied to select ROP cut-points from the histograms for Modes, 1, 2 and 3 shown in FIG. 10. Here, the cut-points slightly above the median ROP values within each mode were selected: 20 m/hr for Mode 3, 33.9 m/hr for Mode 2 and 37 m/hr for Mode 1. Note that other cut-points could be determined according to user preferences. To build the reference traces for the 311 mm bit diameter section, the following drilling parameter settings was selected: i) from Mode 3 drilling parameter settings at all depth intervals with ROP values equal or greater than 20 m/hr; ii) from Mode 2 drilling parameter settings at all depth intervals with ROP values equal to or greater than 33.91 m/hr; and iii) from Mode 1 parameter settings at all depth intervals with ROP values equal to or greater than 37 m/hr. FIG. 11 shows the predicted MSE and ROP values across all depth intervals for the 311 mm bit diameter section for the next well to be drilled in the formation. The vertical black bars mark the transition between the drilling modes. Note that average predicted on-bottom ROP for this section is 40.8 m/hr. In contrast, the fastest on-bottom ROP for the 311 mm bit sections in any of the 11 wells was 33.95 m/hr, and the slowest on-bottom ROP was 19.54 m/hr (see Table 1). Reference traces for WOB, RPM, Differential Pressure, Surface RPM and Total Pump Output are shown in FIGS. 12-16. These reference traces are taken from a .csv file that are at 0.2 m depth resolution.

These results suggest that the drilling parameter settings in the drilling plan for the reference well may yield average ROP of at least 6.85 m/hr faster than the fastest average ROP achieved in any of the previous wells, and may yield average on-bottom penetration rates at least two times faster than the average penetration rate of the slowest drilled well on this pad.

In summary, there are a number of notable findings resulting from this example. First, it has been demonstrated how pattern recognition models using historical data from a group of wells can be used to track learnings (information transfer) about how drillers improve ROP and efficiency within a well and from one well to the next. Conversely, instances have also been shown where there is a lack of such information transfer. Particularly, it has been demonstrated that historical data can be used to identify optimal drilling parameter settings and that these settings can be used to build a reference well and reference traces. Predictions from the reference well indicate that the next well to be drilled on a pad can be drilled with significantly faster average on-bottom rates of penetration than the average on-bottom ROP achieved in any of the wells that were included in the original sample of wells. Specifically, in the 311 mm bit diameter section shown in the example, the predicted average ROP taken from the reference well was 40.8 m/hr compared to 33.95 m/hr for the fastest section drilled. This represents a 20.2% increase in ROP.

While particular embodiments have been described in the foregoing, it is to be understood that other embodiments are possible and are intended to be included herein. It will be clear to any person skilled in the art that modifications of and adjustments to the foregoing embodiments, not shown, are possible.

What is claimed is:

1. A method for drilling a new oil or gas well in a selected geographical location, comprising:
   (a) extracting drilling modes from historic drilling data obtained from a group of drilled wells in the selected geographical location using a pattern recognition model, wherein each drilling mode represents a distinct pattern that quantifies at least two drilling variables at a specified drilling depth;
   (b) selecting a sequence of drilling modes at positions along a reference well as reference drilling modes that represent more efficient values for a selection of one or more of the at least two drilling variables compared to other extracted drilling modes; and
   (c) associating drilling parameter settings with the reference drilling modes, and drilling the new oil or gas well applying at least some of the drilling parameter settings,
   wherein the selection of the one or more of the at least two drilling variables comprises: mechanical specific energy (MSE); or on-bottom rate of penetration (ROP); or both MSE and on-bottom ROP, and
   wherein the selected reference drilling modes represent faster ROP and lower MSE compared to at least some of the other extracted drilling modes at each of the positions along the reference well.

2. The method as claimed in claim 1 wherein the selected geographical region is a pad or a formation.

3. The method as claimed in claim 1 wherein the selected reference drilling modes represent maximum ROP or minimum MSE at each of the positions along the reference well.

4. The method as claimed in claim 1 wherein the step of extracting drilling modes comprises extracting the historic drilling data from the at least two drilling variables of the group of drilled wells, wherein the at least two drilling variables are selected from a group consisting of: mechanical specific energy (MSE), on-bottom rate of penetration (ROP), hole depth, true vertical depth, weight on bit (WOB), differential pressure, rotary revolutions per minute (RPM) at surface or at the drill bit, rotary torque, bit size, bit type, bit wear convertible torque, torque, hook load, standpipe pressure, hook load, autodriller ROP set point, autodriller WOB set point, autodriller differential set point, block height, inclination, tool face, flow, total pump output, total mud volume, drilling fluid type, drilling fluid rheology, geologic data, torque, drag, rotary drilling rig state, slide drilling rig state, and drilling-while-steering rig state.

5. The method as claimed in claim 4 wherein the drilling data is extracted from the at least two drilling variables using a comma separated value or LIDAR Data Exchange File (LAS) template extraction tool.

6. The method as claimed in claim 5 further comprising cleaning, editing and formatting the extracted drilling data before applying the pattern recognition model to the drilling data.

7. The method as claimed in claim 6 wherein the step of cleaning and editing comprises identifying and removing outlier values amongst the extracted drilling data.

8. The method as claimed in claim 6 wherein the step of formatting comprises linearly transforming the at least two drilling variables to standardized values such that the at least two drilling variables are placed on a common scale thereby facilitating computation of variance-covariance matrices utilized by the pattern recognition model.

9. The method as claimed in claim 8 wherein using the pattern recognition model comprises identifying a composite multivariate distribution in the extracted drilling data for each drilling variable included in the model, and un-mixing the composite multivariate distribution into sub-component multivariate distributions, wherein each of the sub-component multivariate distribution is one drilling mode.

10. The method as claimed in claim 9 wherein the pattern recognition model is selected from a group consisting of: finite mixture modelling, mixture likelihood approach to clustering, model based clustering, mixture model clustering, factor-mixture models, probabilistic clustering, unsupervised learning, and latent cluster analysis.

* * * * *